United States Patent [19]
Williamson

[11] Patent Number: 4,838,194
[45] Date of Patent: Jun. 13, 1989

[54] AMPHIBIOUS VEHICLE HAVING AN EFFICIENT WATER-BORNE OPERATIONAL MODE

[76] Inventor: Roger L. Williamson, MPV, INC., P.O. Box 1176, San Antonio, Tex. 78294

[21] Appl. No.: 127,800

[22] Filed: Dec. 2, 1987

[51] Int. Cl.$^4$ ............................................. B63B 35/00
[52] U.S. Cl. ..................................... 114/270; 244/101
[58] Field of Search ............... 114/270, 280, 282, 344; 244/101

[56] References Cited

U.S. PATENT DOCUMENTS

| | | | |
|---|---|---|---|
| 1,929,630 | 10/1933 | Duell | 244/101 |
| 2,399,141 | 4/1946 | Quinn | 114/270 |
| 2,979,016 | 4/1961 | Rossi | 114/270 |
| 3,359,937 | 12/1967 | D'Arena | 114/270 |
| 3,382,836 | 5/1968 | Hume | 114/270 |
| 3,486,477 | 12/1969 | Pender | 114/270 |
| 3,741,146 | 6/1973 | Durrell, Jr. | 114/270 |
| 3,933,112 | 1/1976 | Veazey | 114/270 |
| 3,987,747 | 10/1976 | Locber | 114/270 |

FOREIGN PATENT DOCUMENTS 0285107  12/1986  Japan .................... 114/270

*Primary Examiner*—Sherman D. Basinger
*Attorney, Agent, or Firm*—Gunn, Lee & Jackson

[57] ABSTRACT

An amphibious vehicle is disclosed which is adapted for alternative land and water modes of operation and in which both modes of operation are performed efficiently. The amphibious vehicle includes a vehicle body supported, during land-bound operation, by a front pair of wheels and a rear pair of wheels. Each of the wheels of the vehicle are surrounded by specially-configured fender/sponson units which are rotatable between first and second operational positions through an angle of approximately 180° about the encompassed wheel. In the first operational position, the fender/sponson units function as wheel tenders for land operation. In the second operational position, the fender/sponson units function as sponsons providing floatation to the vehicle and effectively contributing to the streamlined character of the vehicle during traverse through the water by presenting nautical wedges to the water. A rotation mechanism is provided for selectively rotating each of the fender/sponson units between their first and second operational positions. A drive train is provided to selectively propel the vehicle in the land and water modes of operation. The drive train includes a front wheel drive configuration for land-bound operation and a propeller for propelling the vehicle during water-borne operation. A transfer case directs the drive to either the front wheels or the propeller which can be selectively lowered, along with a rudder, for water-borne operation.

17 Claims, 5 Drawing Sheets

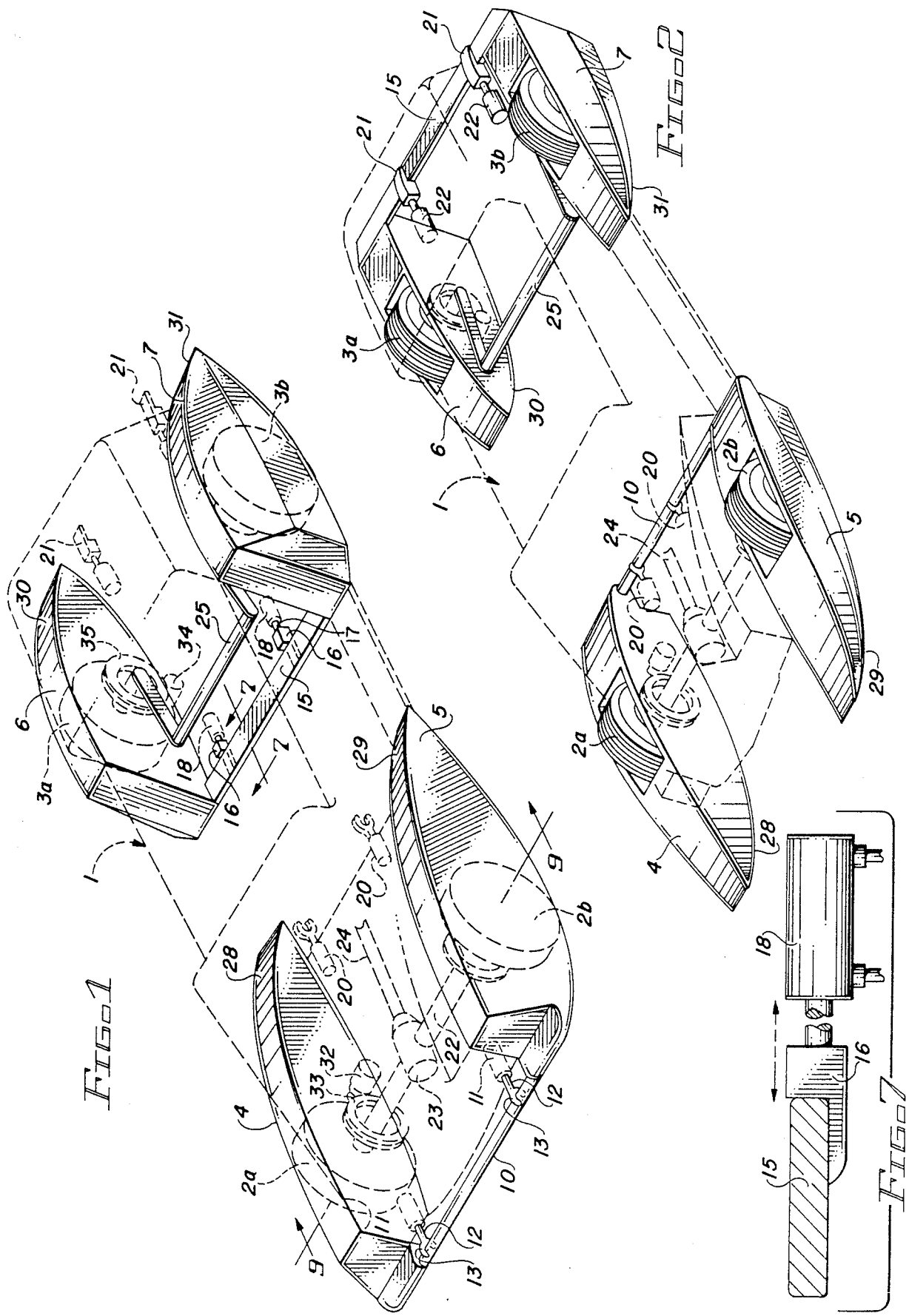

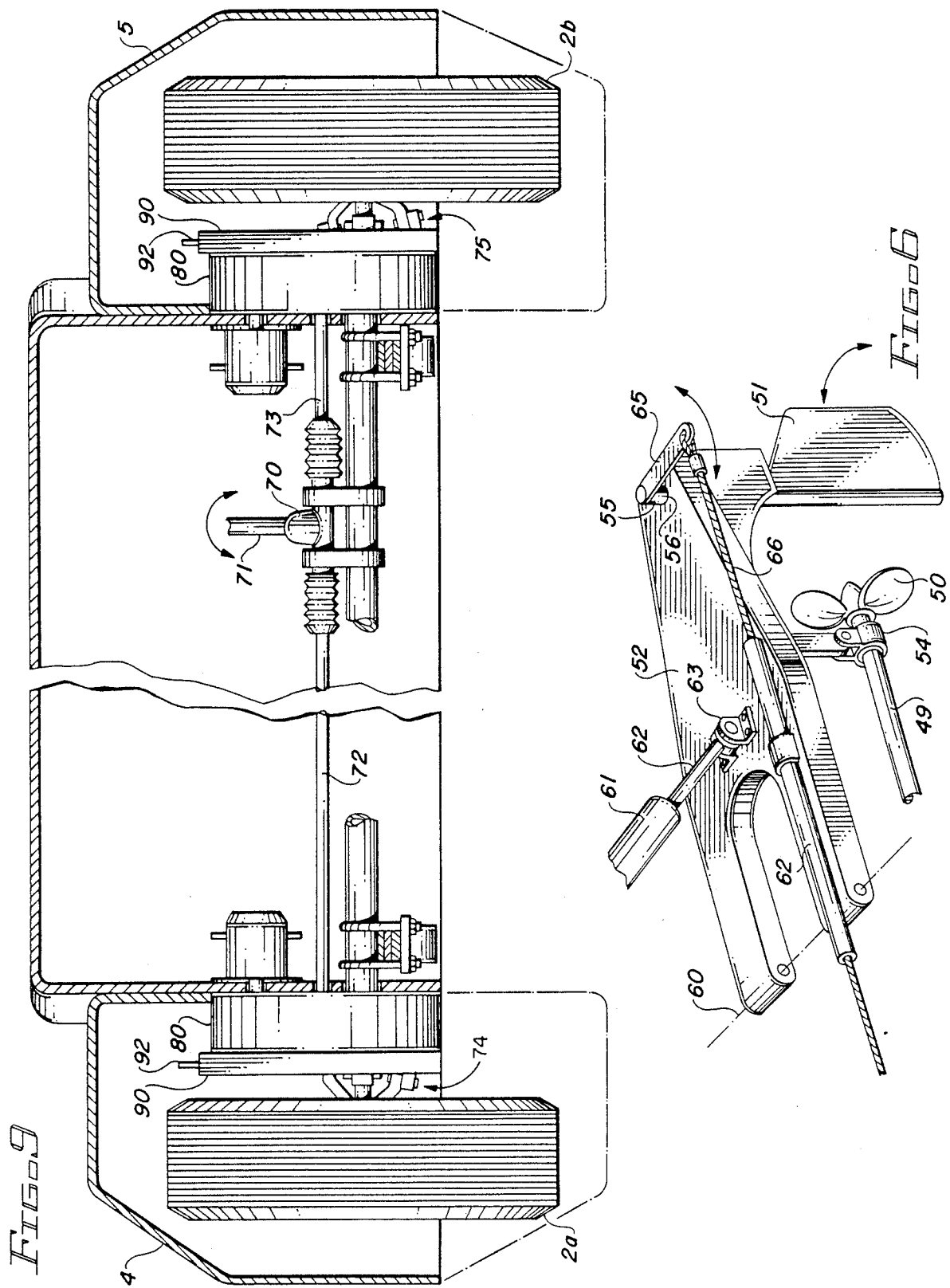

AMPHIBIOUS VEHICLE HAVING AN EFFICIENT WATER-BORNE OPERATIONAL MODE

FIELD OF THE INVENTION

This invention relates to amphibious vehicles and, more particularly, to a vehicle which is fundamentally developed as an efficient amphibious vehicle rather than constituting an adaptation of a land vehicle to a secondary waterborne mode of operation.

BACKGROUD OF THE INVENTION

Numerous examples of amphibious vehicles are known in the prior art, but virtually all the prior art examples may generally be deemed to be adaptations (often crude and occasionally bizarre) of normally land-bound vehicles (e.g., automobiles, trucks, vans, etc.) to a secondary, water-borne mode of operation. A practically universal problem with the prior art amphibious vehicles has been their poor performance characteristics in the water-borne mode of operation which results from the constraints placed by the need to adapt a vehicle designed only for land-bound operation to the secondary mode of water-borne operation.

In contrast, my amphibious vehicle treats both the land-bound and water-borne modes of operation as of equal importance and has been accordingly developed. As a result, the water-borne mode of operation is highly efficient and admits of high-speed stable traverse through the water when desired.

OBJECTS OF THE INVENTION

It is therefore a broad object of my invention to provide an improved amphibious vehicle.

It is another object of my invention to provide such an amphibious vehicle which is equally well adapted to both land-bound and water-borne modes of operation.

It is still another object of my invention to provide such an amphibious vehicle which, when configured for water-borne operation, is highly efficient during traverse through the water.

In a more specific aspect, it is an object of my invention to provide an amphibious vehicle in which fender/sponson units surrounding each of four wheels may be rotated between alternative positions which, respectively, function as fenders in the land-bound mode of operation and present highly efficient nautical wedges through the water during traverse in the water-borne mode of operation.

SUMMARY OF THE INVENTION

Briefly, these and other objects of my invention are achieved by providing an amphibious vehicle adapted for alternative land and water modes of operation and in which both modes of operation are performned efficiently. The amphibious vehicle includes a vehicle body supported, during land-bound operational, by a front pair of wheels and a rear pair of wheels. Each of the wheels of the vehicle are surrounded by specially-configured fender/sponson units which are rotatable between first and second operational positions through an angle of approximately 180° about the encompassed wheel. In the first operational position, the fender/sponson units function as wheel fenders when the vehicle is configured for land operation. In the second operational position, the fender/sponson units function as sponsons providing floatation to the vehicle and effectively contributing to the streamlined character of the vehicle during traverse through the water by presenting nautical wedges to the water. A rotation mechanism is provided for selectively rotating each of the fender/sponson units between their first and second operational positions.

A drive train is provided to selectively propel the vehicle in the land and water modes of operation. The drive train includes an engine, a drive axle coupling the front wheels to effect a front wheel drive configuration for land-bound operation, a differential disposed intermediate the driven axle, a propeller for propelling the vehicle during water-borne operation, a transfer case having an input and first and second selectable outputs, a shaft coupling the engine to the transfer case input, and drive shaft respectively coupling the transfer case first output to the differential and the second transfer case output to the propeller. A mechanism is also provided for selectively lowering the propeller and a rudder into an operational position during the water-borne mode of operation and for raising the propeller and rudder into a non-operational position during the land-bound mode of operation.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a partially phantom view from the upper left front illustrating one embodiment of my invention configured for the land-bound mode of operation;

FIG. 2 is a view similar to FIG. 1 illustrating the vehicle reconfigured to the water-borne mode of operation;

FIG. 6 is a more detailed fragmentary view of the propeller/rudder mechanism particularly illustrating the manner in which the rudder is actuated;

FIG. 7 is a view taken along the lines 7—7 of FIG. 1 and illustrates details of a coupling unit between the rear pair of fender/sponson units and particularly showing the manner in which they are fixed in place in their two operational positions, a similar tie member being employed to couple the front pair of fender/sponson units;

FIG. 9 is a cross-sectional view taken along the lines 9—9 of FIG. 1 illustrating certain details of the front wheel drive and steering mechanism configured for land-bound operation;

DETAILED DESCRIPTION OF THE PREFERRED EMBODIMENT

Figure 3:
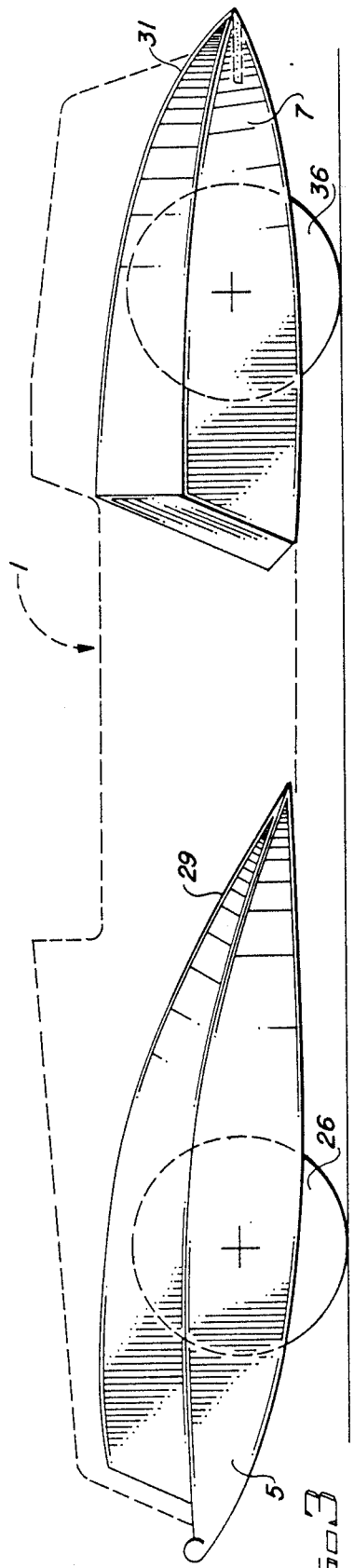
FIG. 3 is a left side view particularly illustrating certain fender/sponson units, which are a principal component of my vehicle, disposed in a first operational position of the land-bound mode of operation.

Referring now to FIG. 1, there is shown a partially phantom view of an amphibious vehicle 1 according to my invention. In FIG. 1, the vehicle 1 is configured in a first alternative mode particularly adapted for land-bound travel. As a result, a front pair of wheels 2a, 2b and a rear pair of wheels 3a, 3b support the vehicle body above the land surface for conventional land-bound operation. Associated with the front pair of wheels 2a, 2b is a first 4 and second 5 fender/sponson unit. Similarly, a third 6 and fourth 7 fender/sponson unit is associated each with one of the rear pair of wheels 3a, 3b. Thus, the right front wheel 2a is encompassed by the right front fender/sponson unit 4; the left front wheel 2b is encompassed by the left front fender/sponson unit 5; the right rear wheel 3a is encompassed by the third fender/sponson unit 6; and the left rear wheel 3b is encompassed by the fourth fender/sponson unit 7. It will be appreciated from a study of FIG. 1 that the fender/sponson units 4, 5, 6, 7 are performing the traditional function of fenders in a land-bound vehicle.

The two front fender/sponson units 4, 5 are coupled together at their forward edges by a cross member 10 which is fixed in position (and hence fixes the fender/sponson units 4, 5 on position) by a pair of hydraulically-actuated, retractable lock assemblies 11 which are fixed to the vehicle body. When the rams 12 of the lock assemblies 11 are fully extended, as shown in FIG. 1, the cross member 10 is engaged by fingers 13 at the ends of the rams 12 to prevent vertical movement of the cross member 10 with respect to the vehicle body to which the hydraulic lock assemblies are fixed. Similarly, the rear pair of fender/sponson units 6, 7 are connected together by a cross member 15 which is generally rectangular in cross section. Referring briefly also to FIG. 7, downward movement of the cross member 15 (and hence downward movement of the forward ends of the fender/sponson units 6, 7) is limited by the retractable stop 16 carried by the ram 17 of a pair of a hydraulically-actuated lock assembly 18. A second lock assembly is provided as shown in FIG. 1 such that the pair of lock assemblies 18 correspond to the forward pair of lock assemblies 11. As will be discussed further below in conjunction with FIG. 2, a second pair of hydraulically-actuated lock assemblies 20 lock the front pair of fender/sponson units 4, 5 in a seocnd operative position; and similarly, a second pair of hydraulically-actuated lock assemblies 21 constrain the rear pair of fender/sponson units 6, 7 in a second operative position.

For reasons which will become more apparent below the amphibious vehicle 1, when in the land-bound configuration, perfectly a front-wheel drive unit such that a front axle 22 is driven through a differential 23 by an engine-driven shaft 24. As will also become more apparent below, the rear suspension is preferably characterized by a trailing arm arrangement 25 in order to provide sufficient clearance for permitting reconfiguration of the amphibious vehicle 1 into the water-borne mode of operation.

Figure 4:
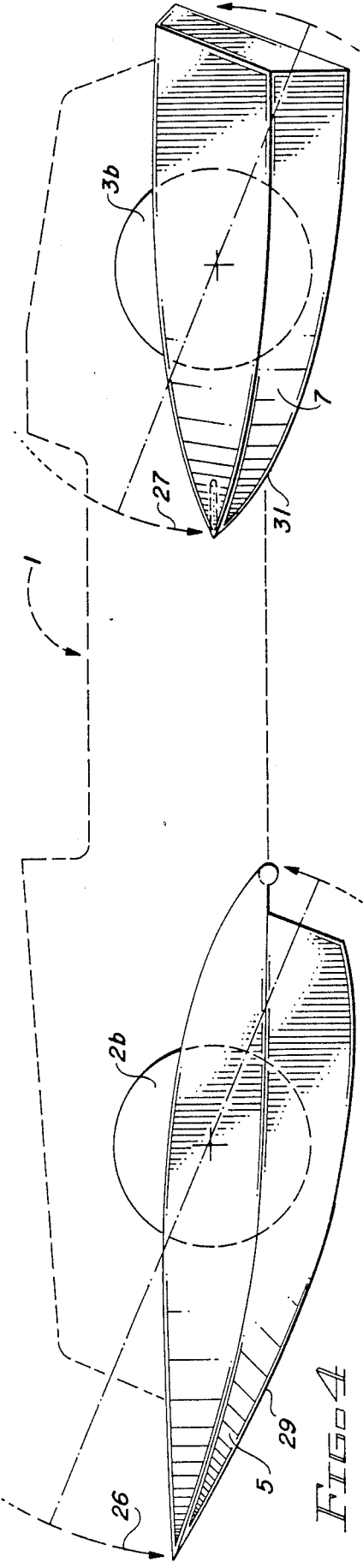
FIG. 4 is a view similar to FIG. 3 illustrating the fender/sponson units rotated to a second operational position for the water-borne mode of operation, in which second position, nautical wedges are presented to the water during traverse therethrough.

The left side view presented in FIG. 3 corresponds to the vehicle state shown in FIG. 1 and particularly shows the left fender/sponson units 5, 7 performing their fender function when the amphibious vehicle 1 is configured for the land-bound mode of operation. Referring now to FIGS. 2 and 4, the amphibious vehicle 1 is illustrated after it has been reconfigured into a state suitable for undertaking the water-borne mode of operation. It will be appreciated that the fender/sponson units. Whether in the positions shown in FIGS. 1 and 2, or the positions shown in 3 and 4, provide floatation to the vehicle 1 by virtue of the fact that much of their enclosed volumes are water tight in compartments to the front and rear of the wheels 2a, 2b, 3a 3b. The body of the vehicle 1 is also essentially water tight and therefore affords further floatation to the amphibious vehicle 1 when it is immersed in water. When the amphibious vehicle 1 enters the water, it does so in the land-bound configuration illustrated in FIGS. 1 and 3 by simply driving into the water using the front wheel drive to the extent possible. When a sufficient depth has been reached, the fender/sponson units 4, 5, 6, 7 are rotated from their first operational position shown in FIGS. 1 and 3 through an angle of approximately 180° about the wheel encompassed by each to the second operative position illustrated in FIGS. 2 and 4. However, before this reconfiguration can be carried out, it is necessary to retract the hdyraulicallyactuated locking assemblies 11 and 18 to respectively release the cross members 10 and 15. As best shown in FIG. 4, the left side fender/sponson units 5, 7 (and the right side fender/sponson units 4, 6 out of view in FIG. 4) are rotated in the counter-clockwise direction about axes more or less coaxial with the wheels 2b, 3b as indicated by the arrows 26, 27 into the configuration illustrated in FIGS. 2 and 4 which is fixed by the locking action of the hydraulically-actuated locking assemblies 20, 21 engaging the cross members 10, 15. In this position, the leading edge of the fender/sponson unit 4 is nautical wedge 28 which effectively contributes to the streamlined character of the amphibious vehicle during traverse through the water. Similarly, the leading edge of the fender/sponson unit 5, in this configuration, is a nautical wedge, and the fender/sponson units 6, 7 have corresponding forwardly facing nautical wedges 30, 31. Referring again to FIGS. 1 and 3, the nautical wedges 28, 29, 30, 31 effect an aerodynamic trailing edge of the fender/sponson units when they are functioning as wheel fenders.

When it is desired to leave the water and regain the land, the hydraulically actuated locking assemblies 20, 21 are withdrawn to disengage the cross members 20, 15 to permit rotate of the fender/sponson units 4, 5, 6,7 counter-clockwise back to their first operative position. The vehicle is then urged close enough to shore to permit the front wheels to engage the bottom and drive the vehicle onto and over the land. The preference for frontwheel drive will not be understood and arises from the value of this drive configuration for entering and, particularly, leaving the water.

Two alternative versions of the mechanisms of rotating the fender/sponsons units 4, 5, 6, 7 between the two operational positions respectively illustrated in FIGS. 1 and 3 (land-bound) and 2 and 4 (water-borne) will be described in more detail below. In FIGS. 1 and 2, they are represented by motor 32 and outside ring gear 33

(right front) and motor 34 and outside ring gear 35 (right rear).

Figure 8:
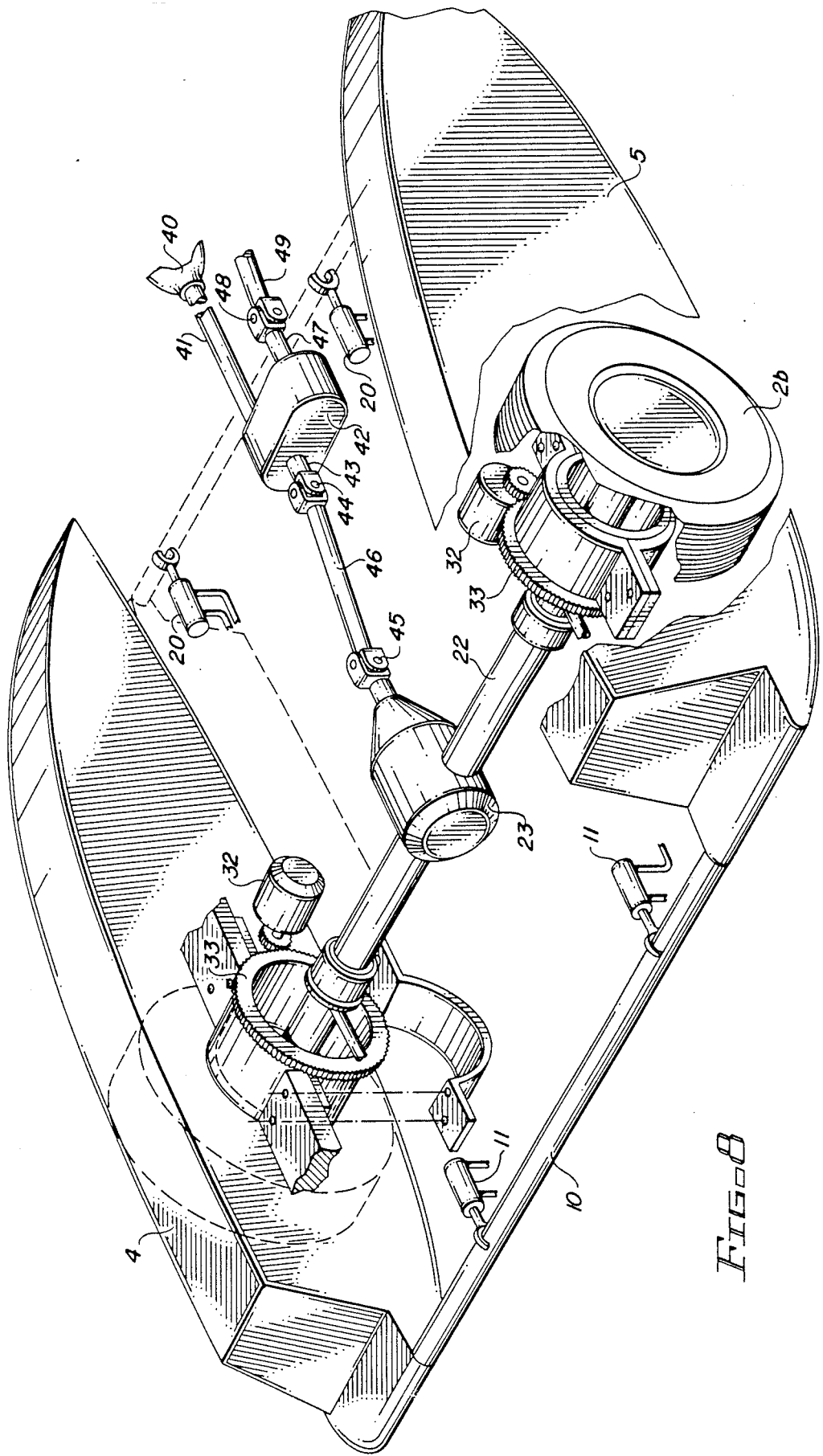
FIG. 8 is a partially broken away view showing certain of the front wheel drive and fender/sponson element rotation mechanisms.

The amphibious vehicle of the present invention preferably uses the same power source for both land-bound and water-borne operation. Thus, referring to FIG. 8, rotational power from an engine/transmission unit 40 is conveyed via shaft 41 to the input of a transfer case 42. Transfer case 42 may be typical of conventional units used with four-wheel drive vehicles and thus has first and second output facing, respectively, forwardly and rearwardly, as shown in FIG. 8. The first output shaft 43 of transfer case 42 is coupled, via a pair of U-joints 44, 45 and an intermediate shaft 46, to the differential 23 which provides front wheel drive to the fornt wheel axle 22 in the more or less conventional fashion. Referring to both FIGS. 5 and 8, the second output shaft 47 from transfer case 42 is connected, via a U-joint 48, to a rearwardly-directed shaft 49 which terminates at a rear most position with a propeller 50.

Figure 5:
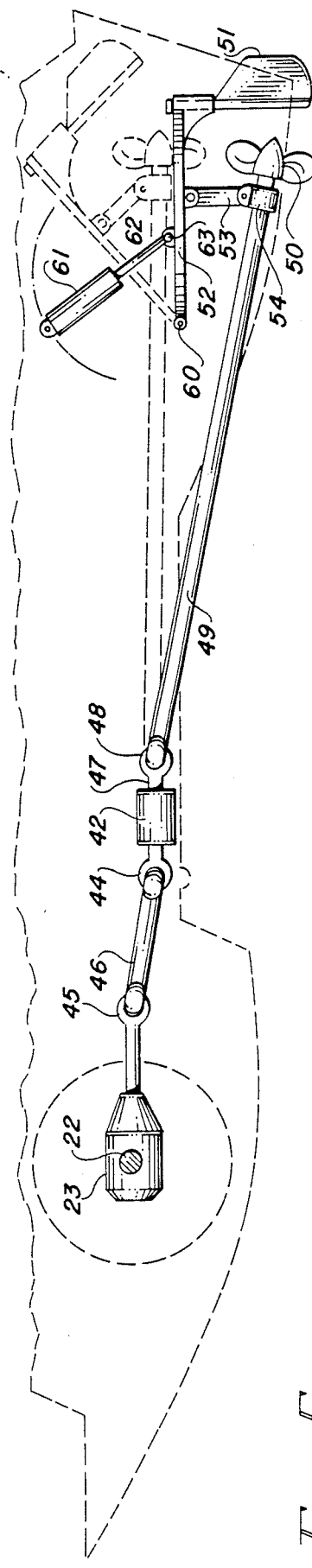
FIG. 5 is a detail view showing certain of the internal drive train components which include a propeller for propelling the vehicle during the water-borne mode of operation and also illustrating a mechanism for lowering and raising the propeller and its accompanying rudder between operational and non-operational positions.

As best shown in FIG. 5, the propeller 50 has a lowered, operational position for water-borne use and an alernative, raised, non-operational position for landbound use. The manner in which the propeller 50, along with a rudder 51 and its accompanying mechanisms, is moved between its alternative positions may best be appreciated with reference to FIGS. 5 and 6. The propeller 50 is supported from a pivotal platform 52 by a bracket 53 which carries, at its lower end, a bearing structure 54 through which the shaft 49 passes immediately forward of the propeller 50. At the rear of the pivotal platform 52, the rudder 51 includes a rudder post 55 which extends upwardly through a journal 56 through the pivotal platform 52.

The pivotal platform 52 swings about a horizontal axis 60 (fixed to the vehicle body by any convenient means) disposed toward the front edge of the platform between the two alternative positions illustrated in FIG. 5. The vertical position of the pivotal 52 is controlled by a hydraulic cylinder 61 having its ram 26 pivotally attached to the platform 52 as shown at 63. Therefore, it will be understood that when the ram 62 of the hydraulic cylinder 61 is in its fully extended position, the pivotal platform 52, the propeller 50 and the rudder 51 are all lowered into their operational position as indicated by the sold lines in FIG. 5 and in FIG. 6. Alternatively, for the land-bound mode of operation, the pivotal platform 52, bringing with it the rudder 51 and the propeller 50, is raised to the non-operational position by retraction of the ram 62 of the hydraulic cylinder 61. Referring briefly to FIGS. 1 and 2, it will again be noted that the trailing arm type of rear suspension 25 is favored in order to give adequate clearance for the retractable mechanism just described.

The position of rudder 51 is controlled by a steering arm 65 acting through the rudder post 55 as best shown in FIG. 6. Cable 66 passing through guide 67 supported on pivotal platform 52 may be moved forwardly and rearwardly to correspondingly move the steering arm 6 and hence the rudder post 55 and the rudder itself 51 to provide steering while in the water-borne traversing mode of operation. Steering may be effected from the same steering wheel used to steer on land by appropriately coupling the mechanisms.

FIG. 9 shows further details of the steering mechanism for the front wheels and also illustrates a presently preferred drive arrangement of the fender/sponson units to effect their rotation about their respectively encompassed wheels. The steering box 70 has an input from a steering shaft 71, rotation of which (by a steering wheel, not shown) causes lateral movement of the steering arms 72, 73 which respectively connect at their outboard ends taking pin assemblies 74, 75 to move the front wheels 2a, 2b from side to side to effect steering in the more or less conventional manner. The width of the fender/sponson units in the wheel housing area is selected to provide adequate clearance for the tires during the steering operation.

Figure 10:
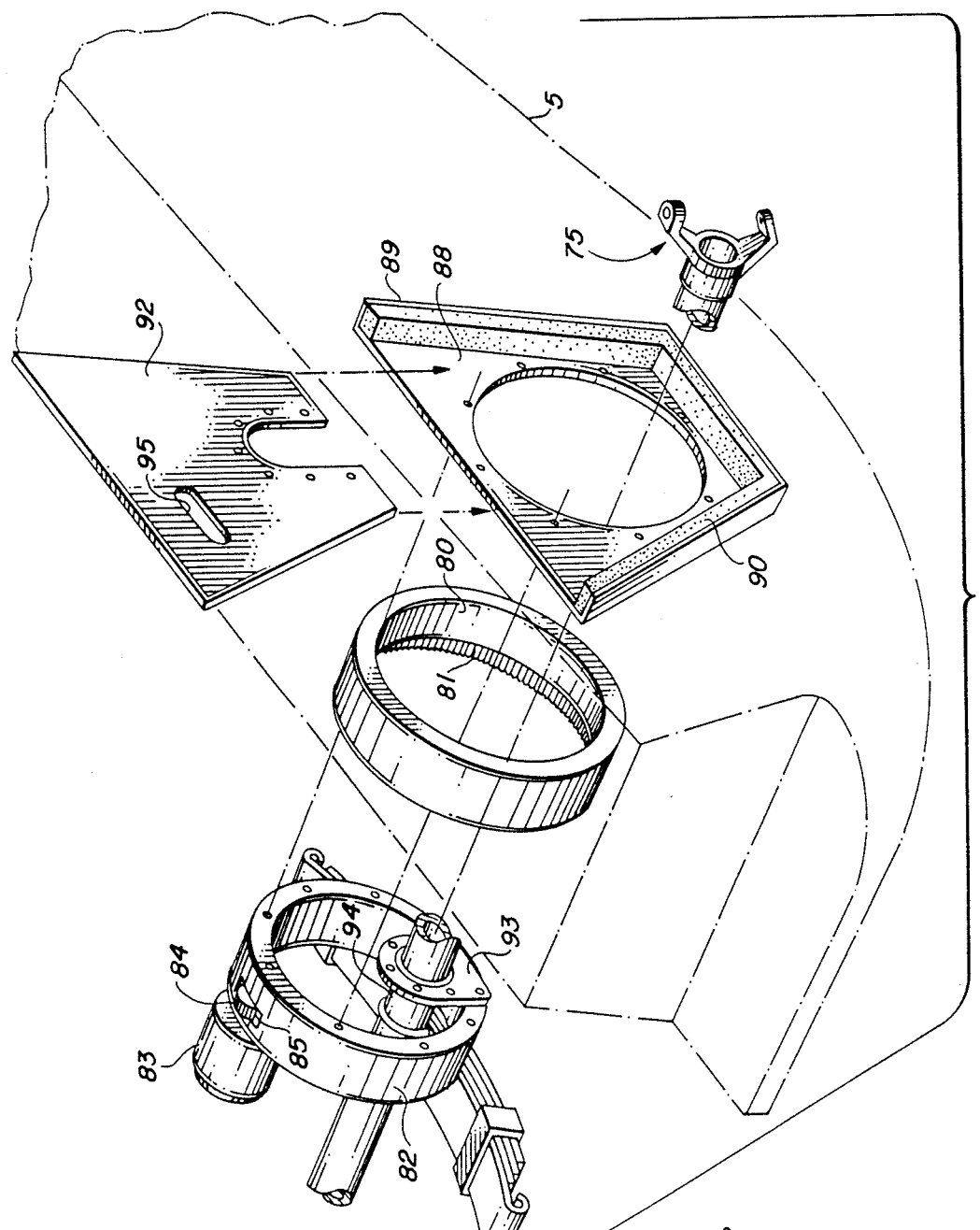
FIG. 10 is a fragmentory exploded view showing the manner in which the fender/sponson units are integrated into the front wheel drive mechanism and also illustrating a variant mechanism for rotating the fender/sponson units.
Figure 11:
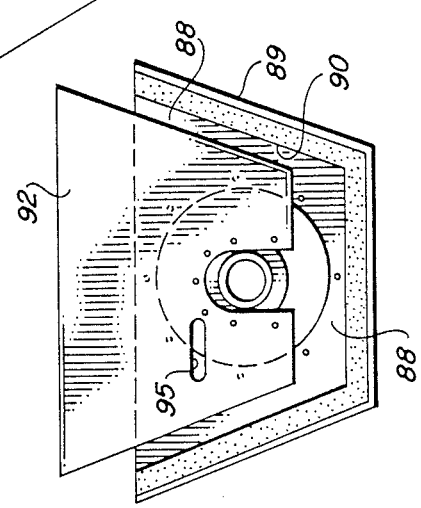
FIG. 11 is a detail view showing the sealing relationship between certain componenets illustrated in FIG. 10.

It will be noted that, in FIG. 9, the motor and ring gear assemblies are different from those illustrated in FIGS. 1, 2 and 8. FIGS. 9, 10 and 11 illustrate the presently preferred method for coupling the fender/sponson units 4, 5, 6, 7 to the amphibious vehicle body, to effect their rotation and to provide effective engine compartment sealing when the amphibious vehicle 1 is configured for water-borne operation. As best shown in the exploded view of FIG. 10, the left front sponson 5 carries an integral ring member 80 which has inwardly directed teeth 81 disposed about its periphery adjacent the side of the sponson directed toward the vehicle body. When the fender/sponson unit 5 is assembled to the vehicle, the ring member 80 fits over the fender/sponson suport ring 82 with rotatable clearance. A drive motor 83 (which may be electric or hydraulic) is carried on the support ring and has a shaft with gear teeth 84 extending through an aperture 85 in the support ring to engage the internal teeth 81 of the integral ring member 80. Thus, when the fender/sponson unit is to be repositioned and has been unlocked, energization of the motor 83 will cause its rotation about an axis at the center of the integral ring member 80. Motor 83 may be electrically energized or, preferably, hydraulically energized.

FIGS. 10 and 11, in particular, show effective means for integrating the fender/sponson unit to the vehicle body and for preventing wear from entering the engine compartment when the amphibious vehicle is configured for waterborne operation. A fender/sponson unit retainer plate 88 bolts to the fender/sponson unit support ring 82 after the fender/sponson unit 5 has been placed in position with the integral ring member 80 peripherally overlaying the support ring 82. The fender/sponson unit retainer plate 88 is generally in the form of a flat-bottomed "V" and includes a peripheral flange region 89 extending along the sides and bottom, but not the top, of the "V". On the inside face of the peripheral flange region 89, a rubber seal 90 extends continuously. An axle flange plate 92, also in the form of a flat-bottomed "V", bolts to an axle flange 93 which is affixed to the axle housing 94 by, for example, welding. Thus, it will be understood that the axle flange plate 92 moves vertically with the wheels whereas the fender/sponson unit retainer plate 88 moves vertically with the fender/sponson unit 5. Note that flange 93 is not attached to support ring 52; axle 94 runs freely through support ring 52.

As a result of this arrangement, the axle flange plate 92 remains above the seal 90 as long as the weight of the amphibious vehicle is placed on the wheels during landbound operation. However, when the vehicle is driven into the water and begins to float, the fender/sponson unit 5 moves upwardly (because of its flotation) carrying the retainer plate 88 with it until the edges of the axle flange plate 92 engage the rubber seal 90 to thereby prevent water from entering the engine compartment. For the front wheels, the axle flange plate 92 includes an aperture 95 through which the steering arms 72, 73

(FIG. 9) may pass. For the rear wheels, no corresponding aperture is necessary.

Although the invention has been described with reference to specific embodiments, this description is not meant to be construed in a limiting sense. For example, a vehicle having only three wheels (or more than four wheels) could be constructed with a like number of fender/sponson units. Having fully described and disclosed in the instant invention in such clear and concise terms as to enable those skilled in the art to understand and practice the same, the invention claimed is:

I claim:

1. An amphibious venhicle for travel on land and in the water, comprising:
   a vehicle body;
   at least three wheels supporting said vehicle body;
   engine means for providing torque to at least two of said wheels;
   at least three fender/sponson units, each of said fender/sponson units encompassing and being rotatably mounted about one of said wheels whereby, when said fender/sponson units are rotated to a first position, said wheels project downwardly therethrough for contact with the land and, when said fender/sponson units are rotated to a second position, said fender/sponson units provide floatation support to said vehicle body;
   a gear assembly of rotatably mounting said fender/sponson units about said wheels, said gear assembly comprising:
   a ring member having teeth along an inner annular surface, being attached to said fender/sponson unit;
   a support ring sized to fit inside said ring member, said support ring having an aperture therein, through which projects a toothed gear, said toothed gear meshing with said teeth along said inner surface of said ring member, said support ring further being fixedly attached to said vehicle body; and
   drive means for turning said toothed gear.

2. An amphibious vehicle for travel on land and in the water, comprising:
   a vehicle body;
   at least three wheels supporting said vehicle body;
   engine means for providing torque to at least two of said wheels;
   at least three fender/sponson units, each of said fender/sponson units encompassing and being rotatably mounted about one of said wheels whereby, when said fender/sponson units are rotated to a first position, said wheels project downwardly therethrough for contact with the land and, when said fender/sponson units are rotated to a second position, said fender/sponson units provide flotation support to said vehicle body;
   a plate assembly for preventing water from contacting said engine means when said vehicle is in the water, comprising:
   a first plate in fixed relation to said one of said wheels;
   a second plate in fixed relation to said fender/sponson unit corresponding to said one of said wheels, said second plate having a flange around a portion of its periphery, and having sealing means adjacent said flange, said second plate further being of the same size and shape as said first plate for mating with said first plate along said sealing means;
   whereby said first plate remains above said sealing means when said vehicle is on land, and said first plate forcibly contacts said second plate along said sailing means when said vehicle enters the water and said fender/sponson units provide upward buoyancy.

3. An amphibious vehicle for travel on and and in the water, comprising:
   a vehicle;
   at least three wheels supporting said vehicle body;
   engine means for providing torque to at least two of said wheels;
   at leat three fender/sponson units, each of said fender/sponson units encompassing and being rotatably mounted about one of said wheels whereby, when said fender/sponson units are rotated to a first position, said wheels project downwardly therethrough for contact with the land and, when said fender/sponson units are rotated to a second position, said fender/sponson units provide flotation support to said vehicle body;
   a plurality of cross members, each of said fender/sponson units being connected to one of said cross members; and
   a plurality of locking assemblies for locking said fender/sponson units in said first and second positions, each of said locking assemblies comprising:
   an attachment member for engaging one of said cross members;
   an actuator arm attached to and integral with said attachment member; and
   means for retracting and extending said actuator arm.

4. The amphibious vehicle of claim 3 wherein said first and second rotated positions differ by an angle of approximately 180 degrees.

5. The amphibious vehicle of claim 1, 2 or 3 further comprising means for propelling said vehicle when it is in the water, said propelling means coupled to said engine means.

6. An amphibious vehicle adapted for alternative land-bound and waterborne modes of operation, said amphibious vehicle comprising:
   a vehicle body;
   a front pair of wheels and a rear pair of wheels, said front and rear pairs of wheels supporting said vehicle body during the land-bound mode of operation;
   first and second fender/sponson units associated with said front pair of wheels;
   third and fourth fender/sponson units associated with said rear pair of wheels;
   each of said fender/sponson units:
   (A) encompassing one of said wheels;
   (B) having one end terminating in a nautical wedge;
   (C) being rotatable between first and second operational positions through an angle of approximately 180° about said encompassed wheel;
   1. said fender/sponson unit, in said first operational position, functioning as a wheel fender when said amphibious vehicle is configured for land-bound operation, said nautical wedge, in said first operational position, facing rearwardly to effect a trailing edge to said fender/sponson unit when functioning as a wheel fender;
   2. said fender/sponson unit, in said second operational position, functioning as a sponson providing flotation to said vehicle and effectively contributing to the streamlined character of said amphibious vehicle during traverse through the water when said vehicle is configured for water-borne operation by presenting said nautical wedge to the water;

fender/sponson unit drive means for selectively rotating said first, second, third and fourth fender/sponson units between said first and second operational positions;

a drive train adapted to selectively drive said amphibious vehicle in said land-bound and water-borne modes of operation, said drive train including:
(A) an engine;
(B) a driven axle coupling said first pair of wheels to effect a frontwheel drive configuration for land-bound operation;
(C) a differential disposed intermediate said driven axle;
(D) a propeller for propelling said vehicle during water-borne operation;
(E) a transfer case having an input and first and second selectable outputs;
(F) means coupling said engine to said transfer case input;
(G) means coupling said transfer case first output to said differential; and
(H) means coupling said transfer case second output to said propeller; and means for selectively lowering said propeller into an operational position during the water-borne mode of operation and for raising said propeller into a non-operational position during the land-bound made of operation.

7. The amphibious vehicle of claim 6 which further includes first, second, third and fourth retractable lock assemblies:
said first lock assembly being adapted to selectively engage and fix the position of said first and second fender/sponson units with respect to said vehicle body when said first and second fender/sponson units are in said first operational position;
said second lock assembly being adapted to selectively engage and fix the position of said third and fourth fender/sponson units with respect to said vehicle body when said third and fourth fender/sponson units are in said first operational position;
said third lock assembly being adapted to selectively engage and fix the position of said first and second fender/sponson units with respect to said vehicle body when said first and second fender/sponson units are in said second operational position;
said fourth lock assembly being adapted to selectively engage and fix the position of said third and fourth fender/sponson units with respect to said vehicle body when said third and fourth fender/sponson units are in said second operational position.

8. The amphibious vehicle of claim 7 in which said first, second, third and fourth lock assemblies are each individually hydraulically-actuable.

9. The amphibious vehicle of claim 6 which further includes a rudder and in which said propeller and said rudder are both mounted to a pivotal platform which is selectively movable between said raised non-operational position and said lowered operational position.

10. The amphibious vehicle of claim 6 in which said fender/sponson unit drive means includes:

a ring gear integral with each said fender/sponson unit;
a motor having an output shaft carrying a drive gear; and
support means for positioning said motor to establish meshing of said drive gear and said ring gear such that energization of said motor causes said ring gear and said fender/sponson unit to rotate.

11. The amphibious vehicle of claim 10 in which each said motor is hydraulically energized.

12. The amphibious vehicle of claim 11 in which said ring gear has inwardlydirected teeth.

13. The amphibious vehicle of claim 10 in which each said motor is electrically energized.

14. The amphibious vehicle of claim 13 in which said ring gear has inwardlydirected teeth.

15. An amphibious vehicle adapted for alternative land-bound and waterborne modes of operation, said amphibious vehicle comprising:
a vehicle body;
a front pair of wheels and a rear pair of wheels, said front and rear pairs of wheels supporting said vehicle body during the land-bound mode of operation;
first and second fender/sponson units associated with said front pair of wheels;
third and fourth fender/sponson units associated with said rear pair of wheels;
each of said fender/sponson units:
(A) encompassing one of said wheels;
(B) having one end terminating in a nautical wedge;
(C) being rotatable between first and second operational positions through an angle of approximately 180° about said encompassed wheel;
1. said fender/sponson unit, in said first operational position, functioning as a wheel fender when said amphibious vehicle is configured for land-bound operation, said nautical wedge; in said first operational position, facing rearwardly to effect a trailing edge to said fender/sponson unit when functioning as a wheel fender;
2. said fender/sponson unit, in said second operation, position, functioning as a sponson providing floatation to said vehicle and effectively contributing to the streamlined character of said amphibious vehicle during traverse through the water when said vehicle is configured for water-borne operation by presenting said nautical wedge to the water; first, second, third and fourth hydraulically-actuated retractable lock assemblies:
(A) said first lock assembly being adapted to selectively engage and fix the position of said first and second fender/sponson units with respect to said vehicle body when said first and second fender/sponson units are in said first operational position;
(B) said second lock assembly being adapted to selectively engage and fix the position of said third and fourth fender/sponson units with respect to said vehicle body when said third and fourth fender/sponson units are in said first operational position;
(C) said third lock assembly being adapted to selectively engage and fix the position of said first and second fender/sponson units with respect to said vehicle body when said first and second fender/- sponson units are in said second operational position; and (D) said fourth lock assembly being adapted to selectively engage and fix the position of said third and fourth fender/sponson units with respect to said vehicle body when said third and fourth fender/sponson units are in said second operational position;

fender/sponson unit drive means for selectively rotating said first, second, third and fourth fender/sponson units between said first and second operational positions, said fender/sponson unit drive means including:

(A) a ring gear integral with each said fender/sponson unit;

(B) a motor having an output shaft carrying a drive gear; and (C) support means for positioning said motor to establish meshing of said drive gear and said ring gear such that energization of said motor causes said ring gear and said fender/sponson unit to rotate;

a drive train adapted to selectively drive said amphibious vehicle in said land-bound and water-borne modes of operation, said drive train including:

(A) an engine;

(B) a drive axle coupling said first pair of wheels to effect a frontwheel drive configuration for land-bound operation;

(C) a differential disposed intermediate said driven axle;

(d) a propeller for propelling said vehicle during water-borne operation;

(E) a transfer case having an input and first and second selectable outputs;

(F) means coupling said engine to said transfer case input;

(G) means coupling said transfer case first output to said differential;

(H) means coupling said transfer case second output to said propeller;

(I) a rudder; and (J) a pivotal platform to which said propeller and said rudder are mounted; and means for selectively lowering said pivotal platform mounting said propeller and said rudder into an operational position dring the water-borne mode of operation and for raising said pivotal platform into a non-operational position during the land-bound mode of operation.

16. The amphibious vehicle of claim 15 in which said ring gear has inwardlydirected teeth and in which said motor is hydraulically energized.

17. The amphibious vehicle of claim 15 in which said ring gear has inwardly directed teeth and in which said motor is electrically energized.

* * * * *